United States Patent [19]
Strutz

[11] 3,967,124
[45] June 29, 1976

[54] APPARATUS FOR DETERMINING SKIN TOLERANCE TO ULTRA-VIOLET RADIATION

[75] Inventor: Ernst Strutz, Zurich, Switzerland

[73] Assignee: Biviator S.A., Grenchen, Switzerland

[22] Filed: Aug. 26, 1975

[21] Appl. No.: 607,923

[52] U.S. Cl. ............................. 250/372; 250/365
[51] Int. Cl.² ........................................... G01J 1/42
[58] Field of Search ................. 250/372, 365, 205; 128/372

[56] References Cited
UNITED STATES PATENTS
3,917,948  11/1975  Strutz................................ 250/372

OTHER PUBLICATIONS

Measurement of Erythemal Energy by Hoyt S. Scott, A.I.E.E. Technical Paper 49-186, May 1949.

*Primary Examiner*—Harold A. Dixon
*Attorney, Agent, or Firm*—Imirie, Smiley & Linn

[57] ABSTRACT

An apparatus for enabling the tolerance of the skin of individual persons to ultra-violet radiation to be determined, including a source of UV radiation and a mask having apertures for allowing UV radiation of different intensities to be applied to the skin of a person being tested.

10 Claims, 6 Drawing Figures

3,967,124

APPARATUS FOR DETERMINING SKIN TOLERANCE TO ULTRA-VIOLET RADIATION

BACKGROUND OF THE INVENTION

The present invention relates to an apparatus for determining the skin tolerance to ultra-violet radiation, comprising a source of ultra-violet radiation and a device for measuring the ultra-violet radiation.

When sun bathing in the open or in so-called solariums, devices are used to an increasing extent to determine the bearable radiation dose from a natural or artificial source of radiation in the erythema active region of between 280 and 315 nm. High ultra-violet radiation has various effects which are harmful to health, such as for example aggravation of latent infections, medication allergies, vegetative disturbances, premature ageing of the skin and skin complaints right up to skin cancer, whilst on the other hand radiation in the UV-A range of between 315 and 390 nm may be used for therapeutic purposes. Applicant's U.S. Pat. application Ser. No. 440,579, filed Feb. 7, 1974 now U.S. Pat. No. 3,917,948 discloses an arrangement for measuring the UV radiation, in which the effect of different proportions of radiation in the UV-B and UV-A regions on human skin are taken into account. The known device has a calibrated measuring cell which feeds an indicating instrument having three measuring regions and is so formed that it not only distinguishes the type of radiation source used, i.e. natural or artificial radiation, but also enables determining of the sensitivity of the skin of the persons to be irradiated. Therefore the known arrangement may be used to ascertain the erythema swelling time of persons of different sensitivity during treatment with natural and artificial UV radiation. This, however, requires complex calculations or reference to a table in order to be able to determine from the measuring value containing the instant intensity on the indicating instrument the radiation dose for a skin type A and a skin type B.

The use of such a device with which the UV-A region can be measured also presupposes specialist knowledge and requires calculations or checking of predetermined values from extensive tables, especially, however, knowledge concerning the given type of skin.

The object of the invention consists in that, by clinically ascertaining average values of energy supply of the UV radiation for each type of skin which produces an erythema to provide a sunbather, a visitor to a solarium or a doctor giving treatment a means of ascertaining the type of skin taking into account the normal skin condition of individuals.

The technical problem underlying the object of the invention is to produce a simple and cheap arrangement by means of which, using any available UV radiation source and a measuring device, at least an erythema may be produced on the skin.

SUMMARY OF THE INVENTION

According to the present invention there is provided an apparatus for determining the tolerance of skin to UV radiation, comprising a UV radiation source and a device for measuring the UV radiation, wherein the UV radiation source and the device for measuring the UV radiation are adapted to be switched on for a predetermined period, so that radiation from the UV source acts on the skin of a test person, a mask being provided between the UV source and the skin, said mask defining at least three apertures of which at least two are each covered by a filter.

According to a further feature of the invention, the filters divide the energy supply passing through the openings of the mask at a ratio of 1:2:4.

The various openings of the mask according to a preferred embodiment of the invention have different configurations, preferably a square, a circular and a triangular configuration, of which the circular opening is covered by a filter reducing the radiation intensity to a half compared with the square opening and the triangular opening reducing the intensity compared with the square opening to a quarter.

The device for measuring the UV radiation in accordance with the invention is a UV radiation dosimeter which has a switch position "compatability measurement."

The device for measuring the UV radiation has a dial provided with a rotatable button. The dial is preferably sub-divided into a plurality of equally distributed setting sections and has symbols corresponding to the symbols located on the mask and symbols associated with the tolerance measurement.

By means of the arrangement in accordance with the invention at least three types of skin may be determined, namely, insensitive, normal and sensitive. The measuring device in the switch position "tolerance measurement" allows the UV radiation source to be active for a certain time, so that it produces a supply of UV radiation of predetermined intensity. The energy supply is a clinically ascertained average value according to the individual tolerance so that with each type of skin an erythema is produced. This radiation passes via the openings in the mask, which for this purpose is placed on the forearm of the test person, and acts on the skin of the test person. In accordance with the type of skin, it produces an erythema in the region of the square, or in the region of the square and the circular opening or in the region of all openings.

Since the square opening permits the radiation energy to pass through unhindered, an erythema is produced with every type of skin. The test person now knows his skin type, either insensitive — only one erythema —, normal — two erythemas — or sensitive — three erythemas. From the test result he can determine his individual energy supply of UV radiation by rotating the button of the UV radiation dosimeter to a suitable position on the dial.

The circular opening due to the filter can pass only 50% of the radiation energy produced, therefore herein an erythema is only produced with normal and sensitive types of skin.

The triangular opening due to the filter located there can pass only 25 percent of the radiation energy produced, so that an erythema is produced only with sensitive types of skin. There is no longer any need for special calculations or looking up tables and the like cumbersome operations and specialist knowledge to determine an individual erythema.

According to a second embodiment of the invention the mask is located at one end of a hollow cylinder which at its other end has a UV radiation source.

BRIEF DESCRIPTION OF THE DRAWINGS

The invention will be described further, by way of example, with reference to the accompanying drawings, in which.

DETAILED DESCRIPTION

Figure 1:
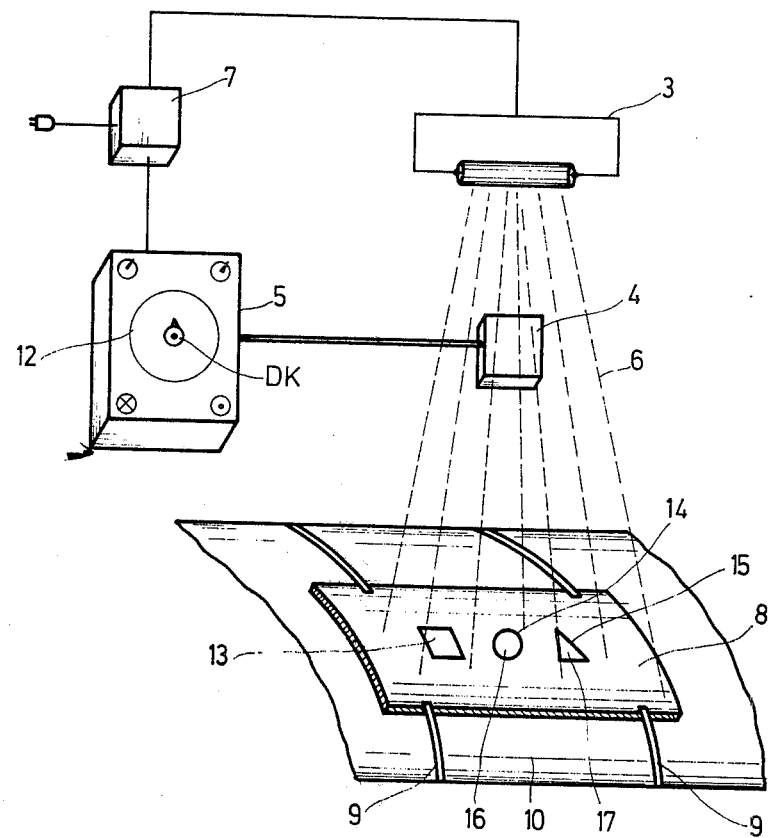
FIG. 1 is an arrangement for determing skin tolerance with regard to UV radiation in accordance with the invention.

For determining the skin bearability of an individual with reference to UV radiation, an arrangement as shown in FIG. 1, includes a UV radiation source 3, a device 5 having a calibrated measuring cell 4 for measuring the UV radiation 6, a power supply 7 adapted to be connected to the mains supply and a mask 8 to be described in more detail. The mask 8 is securable by means of detachable securing means 9 to the body of the test person, preferably at the forearm 10.

The device 5 is a dosimeter, such as for example described and shown in detail in the U.S. Pat. application Ser. No. 594,647, filed July 10, 1975 in the name of Karl Adler and has a switch position "tolerance measurement" associated with a rotatable button 11 indicated on a dial 12 associated with the button 11 (see FIG. 5) and denoted by "V." The UV radiation source 3 is adapted to be switched on for predetermined periods by means of this device 5. The tolerance measurement is effected by setting the rotary button into the switch position V, which has a light-up time associated therewith which is determined for each type of quartz tube lamp by clinical tests.

Figure 2:
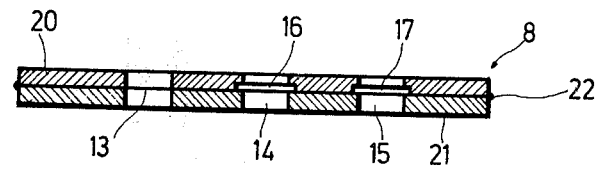
FIG. 2 is a section though a mask apertaining to the arrangement of the invention.

The mask 8 has three openings 13, 14, and 15, of which opening 13 is square, opening 14 is circular and opening 15 is triangular. The openings 14 and 15 are each covered by filters 16 and 17. The arrangement as shown by FIG. 2 is such that the mask comprises two plates 18 and 19 preferably made of plastics material and which have corresponding openings 13 to 15. The plate 18 moreover has inwardly facing recesses to receive the filters 16 and 17. The plates are interconnected by a weld seam 20 at all edges.

The filters 16 and 17 are such that the energy of the UV radiation produced by the radiation source 3 allowed to pass through the openings 13, 14 and 15, is divided at a ratio 1:2:4, i.e. the square opening permits the UV radiation to pass unhindered, the filter in the circular opening permits only 50 percent to pass and the filter in the triangular opening permits only 25 percent of the energy produced to pass.

Figure 3:
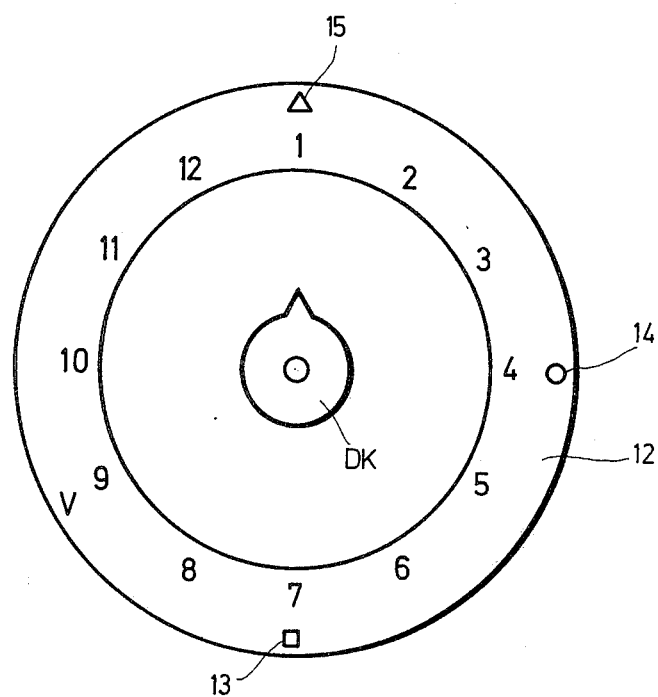
FIG. 3 is a dial for the setting device of the device for measuring the UV radiation.

When using the arrangement in the manner shown and described therefor, depending upon the type of skin involved, at the end of the radiation period controlled by the device 5 the test person has either one, two, or three erythemas, which due to their geometric shape serve to indicate skin type. By such clinical tests, the user of the arrangement can ascertain and select by means of the device 5 provided with the dial 12, the individual radiation period bearable on the first day for his type of skin, thus positions □, O or △ as shown in FIG. 3.

Figure 4:
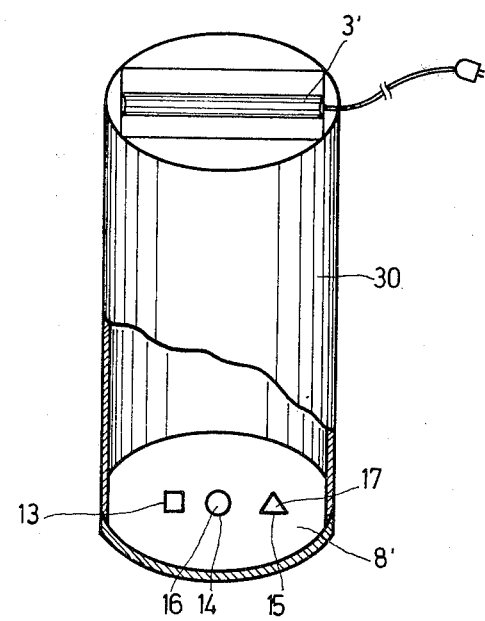
FIG. 4 is a second embodiment of the invention.

For determining the skin tolerance under natural sun conditions, using the principle in accordance with the invention, a radiation source in form of a quartz lamp 3' having a low energy production, is mounted at the upper end of a hollow cylinder 21, (see FIG. 4) which at its lower end has a mask 8' similar to previously described mask 8. This mask 8' also has three openings 13, 14 and 15, of which the openings 14 and 15 are covered by a filter 16 and 17. The output of the quartz lamp is determined on the basis of clinically tested average values, so that the skin sensitivity of an individual may be ascertained in the manner described.

Figure 5:
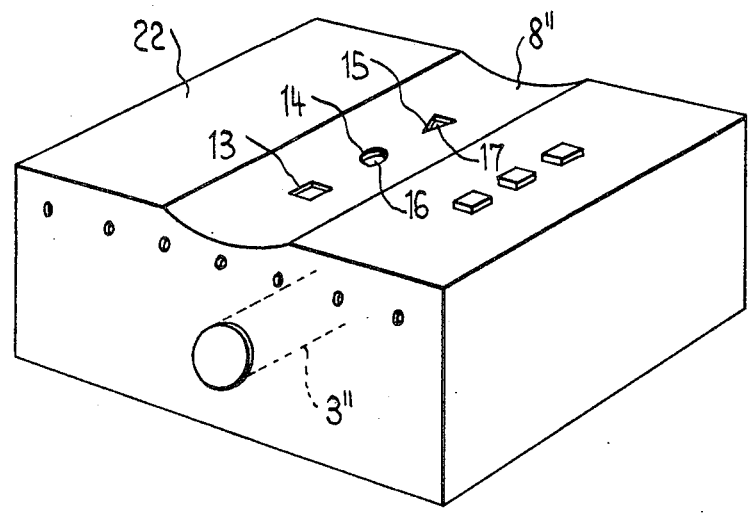
FIG. 5 is an alternative embodiment.

In an alternative embodiment, as shown in FIG. 5, the UV rays are shown in an upward direction. The radiation source 3" is accommodated in a housing 22 which is adpated as an armrest having a recess for the arm. The three openings 13, 14 and 15, having the filters 16 and 17 are provided in the recess. The remaining elements correspond with those in the above examples.

Figure 6:
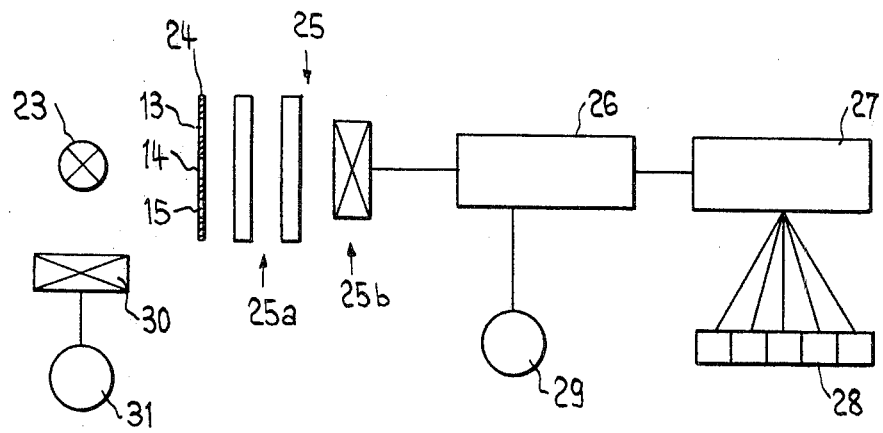
FIG. 6 is a block diagram of a further embodiment.

FIG. 6 shows schematically a further alternative embodiment in the form of a block diagram in which the radiation dose emitted through the three openings is no longer controlled by filters but by electronically controlled closure flaps, the structure being usable in an identical manner to the apparatus FIG. 5.

The electronic circuit of such a device is similar to that already described in the said U.S. application Ser. Nos. 440,579 and 594,647.

The apparatus includes the UV lamp 23, an apertured partition 24 having openings 13, 14 and 15, a detector 25 comprised of a UV-A and/or UV-B filter 25a and photocell 25b, an analogue to digital converter 26, a digital counter 27 which controls the light closure flaps 28, an impulse control lamp 29 to monitor the measuring device and a second photocell 30 with indicating device 31 for setting and determining the wavelength range.

By means of this device the sensitivity of a person to a certain wavelength range can be determined at any time, whereby the ageing of the lamp is automatically taken into account.

The radiation passing through the filter is converted into a number of impulses proportional to its intensity and arrives at the counter 27. In accordance with the medically required radiation dose, the light closure flaps of the individual openings are opened and closed by suitable means. The individual openings thereby receive the dose of radiation corresponding exactly to those of the clinical average values of the skin tolerance types.

In the embodiment shown in FIG. 5 the arm rest is cooled by a fan.

In this simple manner by means of the arrangements described, individual skin types can be reliably dosed with radiation, so that harmful effects can be minimized. For this it is sufficient after ascertaining the type of skin to set the dosimeter to the corresponding symbol.

The division of the tolerance of the skin is not restricted to three types. A division in five different types with the relationship 1:1,4:2:2,8:4 is also possible, whereby the mask, the filters or the light valves and the dial with the rotatable button at the UV-meter have to be adapted accordingly, leading to two more symbols: ◠,◻.

I claim:

1. An apparatus for determining the tolerances of skin to UV radiation, comprising a UV radiation source and a device for measuring the UV radiation, wherein the UV radiation source and the device for measuring the UV radiation are adapted to be switched on for a predetermined period, so that radiation from the UV source acts on the skin of a test person, a mask being provided between the UV source and the skin, said mask defining at least three apertues and means for the control of the radiation flux through each of said apertures.

2. An apparatus as claimed in claim 1, in which the means for the control of the UV radiation flux through each of said apertures are light closure flaps, controlled by the digital counter of the device for measuring the UV radiation.

3. An apparatus as claimed in claim 1, in which the device for measuring the UV radiation is a UV radiation dosimeter which has a switch position "tolerance measurement."

4. An apparatus as claimed in claim 1, in which the device for measuring the UV radiation has a dial associated with a rotatable button and which is divided into three equal setting sections and on predetermined part sections has symbols corresponding to symbols provided on the mask and a symbol associated with the tolerance measurement.

5. An apparatus as claimed in clam 1, in which filters divide the UV radiation flux passing through the apertures defined by the mask at a ratio of 1:2:4.

6. An apparatus as claimed in claim 5, in which the apertures defined by the mask have different configurations, a first aperture being a square, a second being circular and a third being triangular, said circular aperture being covered by a filter reducing the transmitted radiation intensity to half that of the square aperture and the triangular aperture reducing the transmitted radiation intensity to a quarter of the radiation intensity transmitted through the square opening.

7. An apparatus as claimed in claim 6, in which the mask has detachable securing means.

8. An apparatus as claimed in claim 7, in which the mask comprises two superposed plastics material rectangular plates between which the filters are arranged, the plates being welded together along their edges.

9. An apparatus as claimed in claim 6, in which the mask is located at one end of a hollow cylinder which at its other end has a UV radiation source.

10. An apparatus as claimed in claim 6, in which the UV radiation source is inside a housing which is adapted as an armrest having a recess for the arm, the three apertures with the two filters being provided in said recess.

* * * * *